United States Patent [19]

Evkin et al.

[11] 4,199,398
[45] Apr. 22, 1980

[54] ROTARY FILM APPARATUS

[76] Inventors: Ivan F. Evkin, Bulvar Matrosa Zhelesnyaka, 9a, kv. 76; Viktor M. Olevsky, Leningradsky prospekt, 75a, kv. 91; Vitaly R. Ruchinsky, prospekt Mira, 202, kv. 21; Valentin A. Tatyanchikov, Universitetsky Prospekt, 4, kv. 296; Jury N. Nikolaev, proezd Dezhneva, 18, kv. 47, all of Moscow, all of U.S.S.R.

[21] Appl. No.: 873,432

[22] Filed: Jan. 27, 1978

[51] Int. Cl.² .............................................. B01D 1/22
[52] U.S. Cl. .................................. 159/6 R; 159/13 A; 159/15
[58] Field of Search ................ 159/13, 15, 6; 202/232

[56] References Cited

U.S. PATENT DOCUMENTS

| 266,925 | 10/1882 | Trobach et al. | 202/236 |
| 3,311,457 | 3/1967 | Goossens | 159/6 W |
| 3,472,304 | 10/1969 | Evkin | 202/236 |
| 3,547,593 | 12/1970 | Olevsky et al. | 202/236 |

Primary Examiner—Norman Yudkoff
Attorney, Agent, or Firm—Steinberg & Blake

[57] ABSTRACT

A rotary film apparatus comprising a vertical body housed in a jacket and having a heat-exchanging surface formed, according to the invention, by series-connected and oppositely directed conjugated truncated cones, the bases of said cones being made rounded.

3 Claims, 7 Drawing Figures

ROTARY FILM APPARATUS

The present invention relates to heat-exchange vessels, and more particularly to rotary film apparatuses.

The invention can find wide application in chemical, petrochemical, and pharmaceutical industry, and in the food industry, in vessels intended for carrying out quick liquid-phase exothermal chemical reactions, as well as processes of distillation, concentration and evaporation of thermally unstable substances under vacuum, and evaporation in an air current or a current of an inert gas under atmospheric pressure.

Film heat-exchange and mass-exchange apparatuses of a rotary type are developed because they provide for "mild" conditions for carrying out heat exchange which accompanies chemical reactions, as well as processes of distillation, evaporation, concentration and vaporization which make it possible to avoid decomposition and polymerization of the products being treated, especially thermally unstable ones. In such apparatuses the processes take place in a film, the liquid is stirred well, and there is practically no hydrostatic pressure of the liquid column which makes it possible to treat products under vacuum, i.e. reduce the temperature in the apparatus. In addition, the residence time of the product in these apparatuses, as compared with other types, is brief and lasts a few seconds which also makes it possible to reduce the thermal effect to the minimum.

A distinctive feature of rotary film apparatuses is that they combine highly intensive heat exchange and mass exchange with a short residence time of the product.

Such rotary apparatuses used are evaporators, reactors, and vaporizers.

In this connection rotary film apparatuses have been developed wherein liquid films on the heat-exchanging surface of the apparatus are made by rotor blades rigidly secured on the drive shaft and spaced from the body at a distance of 1 to 2 mm (see FRG Pat. No. 1,029,642,Cl.12a,2 of Apr. 30, 1958; FRG Pat. No. 971,974,Cl.12a,2 of Apr. 23, 1959; U.S. Pat. No. 2,596,086,Cl.159-6 of May 6, 1952). These apparatus have a limited heat-exchanging surface because of their complicated design, technology of manufacture, assembly and operation due to a small gap between the walls of the body and rotor blades and a necessity of dynamic balancing of the rotor with a view to thermal deformations of the rotor and the body of the apparatus. The apparatus is sensitive to thermal loads on the liquid.

In the rotary film evaporator developed later wherein the liquid film on the heat-exchanging surface of the apparatus was made by rotor blades pivotally mounted on the drive shaft and sliding along the surface of the apparatus body, the problem of extending the heat-exchanging surface was not solved either (see British Pat. No. 923,884,Cl.32 B of Apr. 8, 1963; British Pat. No. 918,922,Cl.32 B of Dec. 12, 1962). In addition, apart from the undersirable wear of blades and the rotor the direct contact of rotor blades with the heat-exchanging surface of the apparatus results in contamination of the product. The presence of blades rubbing against the body necessitates careful treatment of the surface of the apparatus body and preparation of a polished surface. The rotor blades must be made from wear-resistant materials having high anti-friction properties.

The problem of extending the heat-exchanging surface was partly solved in a later simple construction of a rotary film apparatus comprising a vertical body having a heat-exchanging surface and housed in a jacket whose space communicates with the inlet of the heat carrier into the apparatus, and a rotor shaft mounted in the body and carrying hollow drums with corrugated walls having apertures for the outlet of the liquid onto the heat-exchanging surface (see USSR Inventor's Certificate No. 233,921,Cl.B01 1/00 of Sept. 29, 1965). In this rotary apparatus the liquid film on the heat-exchanging surface is formed without stirring devices. Under the effect of the centrifugal force the liquid is distributed over the heat-exchanging surface of the apparatus body through the apertures of corrugated drums.

The main disadvantage of this apparatus is the limited heat-exchanging surface and the fixed residence time of the reactants in the apparatus, and in the final analysis insufficient effectiveness of heat and mass exchange.

It is the principal object of the present invention to provide a rotary film apparatus which would make it possible to intensify heat exchange.

It is another object of the present invention to provide a rotary film apparatus which would intensify heat exchange.

These and other objects are achieved by the provision of a rotary film apparatus comprising a vertical body housed in a jacket in whose space the heat carrier circulates and having a heat-exchanging surface, and a rotor shaft mounted in the body and carrying hollow drums with corrugated walls provided with apertures for the outlet of the liquid onto the heat-exchanging surface which, according to the invention, is formed by series-connected oppositely-directed truncated cones conjugated with their bases which bases are rounded.

Owing to such embodiment of the heat-exchanging surface its area becomes about three times larger without increasing the diameter and height of the apparatus.

In addition, by forming a heat-exchanging surface from cones wth different inclination angles it is possible to provide for a rather considerable range of residence time of the product in the apparatus.

It is advisable that the rounded bases of the conjugate cones should form a semi-circle in an axial section.

Such embodiment of the bases makes it possible to provide for a smooth flow of the liquid from the surface of the upper cone to that of the lower cone, and in addition simplifies the manufacture of the apparatus body.

Another feature of the present invention is that horizontal rings enveloping the body in the place of conjugation of larger bases of the cones are mounted with openings in each of them, and along the path of movement of the heat carrier a vertical partition is mounted in front of each opening consecutively offset relative to another due to which the heat carrier flows upwards in the space of the jacket performing a circular progressive motion.

The horizontal partitions with openings and the vertical partitions in the space between the body and the jacket ensures good circulation of the cooling agent (the heat carrier) and a higher coefficient of heat transfer.

The present invention is explained below by a detailed description of a specific embodiment and the accompanying drawings wherein.

Figure 1:
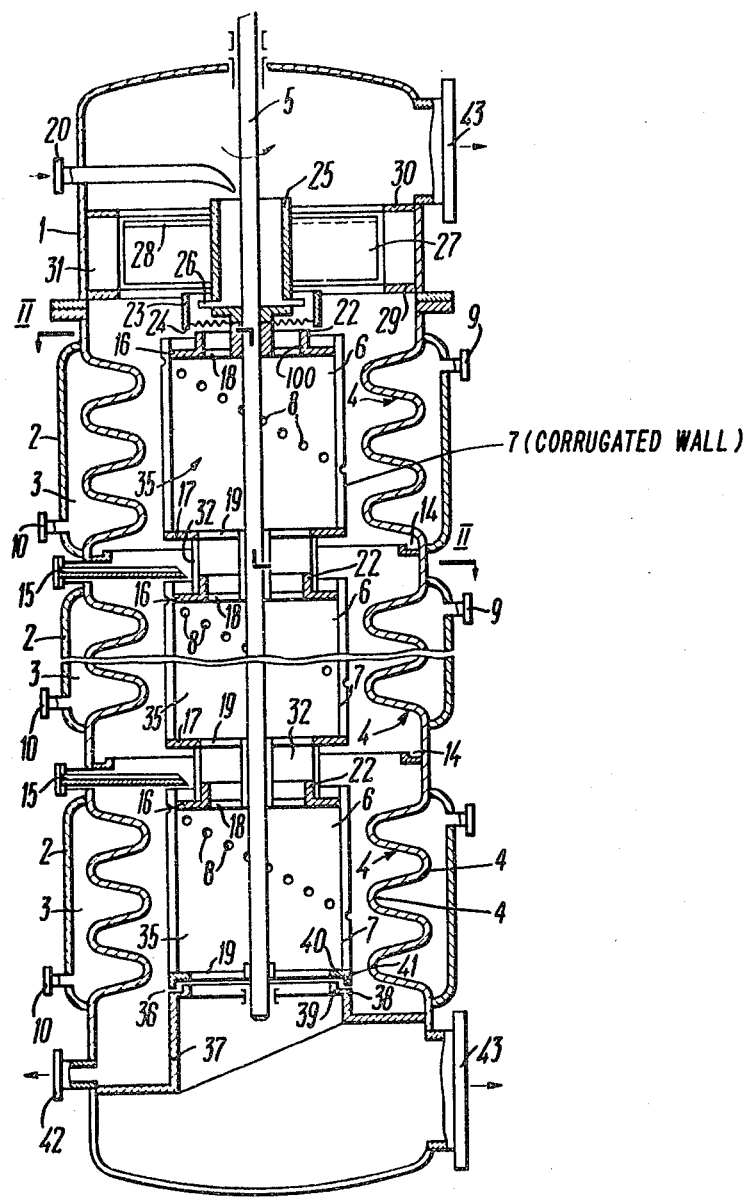
FIG. 1 is a general view of the film evaporator, according to the invention, in longitudinal section.
Figure 2:
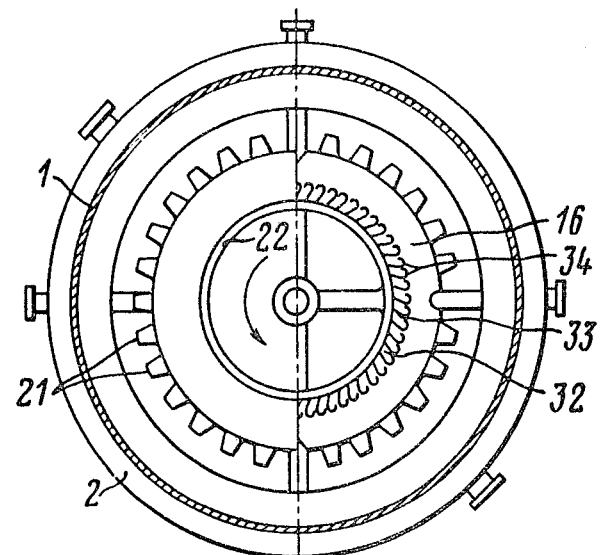
FIG. 2 is a section along II—II of FIG. 1.
Figure 4:
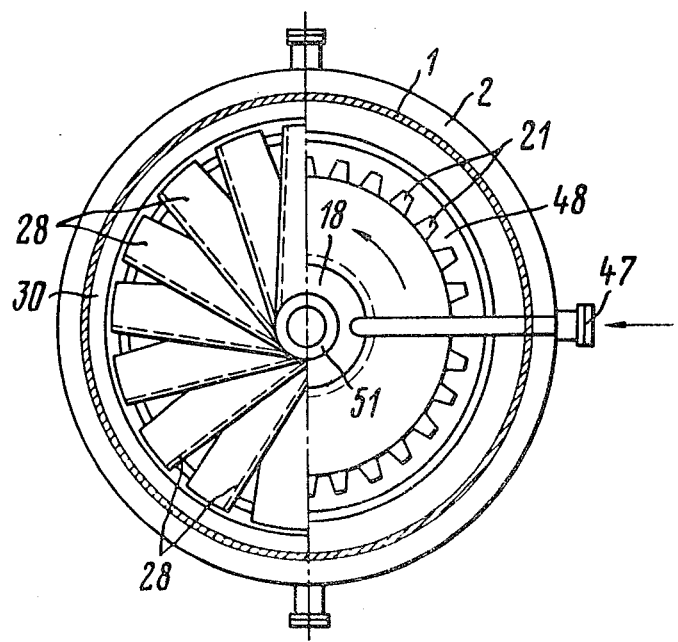
FIG. 4 is a section along IV—IV of FIG. 3.

The rotary film apparatus of the present invention comprises a vertical body 1 (FIGS. 1 to 6) housed in a jacket 2 in whose space 3 (FIGS. 1,3,5) a heat carrier circulates (along dotted arrows). The body 1 has a heat-exchanging surface 4 and mounted therein is a shaft 5 of the rotor carrying hollow drums 6 with corrugated walls 7 provided with openings 8 for the outlet of the liquid being treated onto the heat-exchanging surface 4 of the body 1.

Pipe connections 9 and 10 respectively serve for feeding in and discharging the heat carrier.

Figure 7:
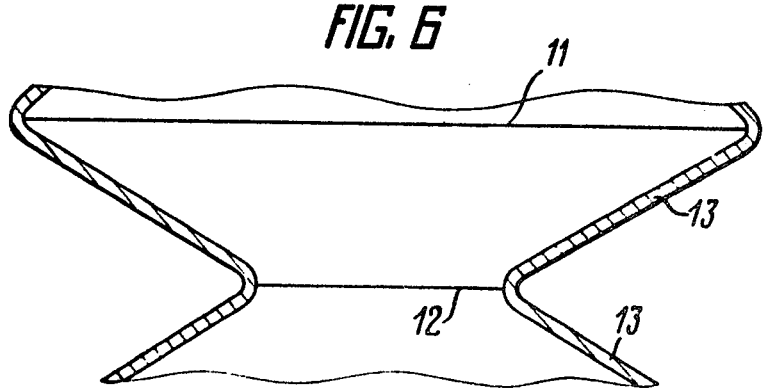
FIG. 7 is a portion of the heat-exchanging surface formed by oppositely-directed truncated cones conjugated with their bases, according to the invention, in longitudinal section.

According to the invention the heat-exchanging surface 4 of the body 1 is formed by series-connected oppositely-directed truncated cones 13 conjugated with their bases 11 (FIG. 7) and 12. The bases 11 and 12 of the cones 13 are rounded and form a semi-circle in their axial section. Thus, each of the truncated cones have opposed first reduced diameter and second enlarged diameter base regions, 12, 11, respectively, and alternate pairs of truncated cones are conjugated at respective first and second base regions.

In order to better present technical advantages of the proposed invention and its broad technological possibilities for application the description discloses in detail several rotary film apparatuses, namely, an evaporator for the processes of distillation, concentration and evaporation of thermally unstable substances under vacuum, a vaporizer for vaporization in an air current or an inert gas current at atmospheric pressure, and a reactor for carrying out rapid liquid-phase exothermic chemical reactions.

The heat carrier used in the evaporator and the vaporizer is heating steam, and in the reactor a cooling agent such as water.

It is known that, depending on the output, apparatuses of this type can be multi-sectional. In this case a circular collector 14 (FIGS. 1, 3, 5) is provided between sections of the apparatus for discharging the liquid from the heat-exchanging surface 4. Channels 15 for conveying the liquid onto the drum 6 of the lower section are located under the circular collector 14.

In the rotary film evaporator shown in FIG. 1 the drums 6 are secured by means of bands and screws (not shown in the drawings) on rings 16 (FIG. 2) and 17 (FIG. 1) of hubs 18 and 19 rigidly mounted on the shaft 5.

A pipe connection 20 serves for feeding the liquid being treated onto the drums 6. Thus, the liquid to be treated passes through a central opening 100 provided in ring 16. Ring 16 is provided with a rim 22 (FIG. 1) and is mounted on the upper end of each drum and serves for distributing the liquid being treated over the inner surface of corrugations 21 (FIG. 2) of the drums 6. A cylindrical shell 23 with a toothed base 24 is fastened to the body 1 above the ring 16. A cylinder 25 with tubes 26 serving for distributing the liquid being fed over the inner surface of the cylindrical shell 23 and located radially at the base of said cylinder is mounted inside the shell 23 on the shaft 5 of the rotor. Inclined blades 27 with upwardly bent edges 28 which separate the liquid being treated from the steam flow are secured on the walls of the cylinder 25. Rings 29 and 30 respectively are secured opposite the edges 28 above and under the blades 27. Baffles 31 are vertically mounted between the rings 29 and 30.

A centrifugal separator 32 (FIG. 2) is mounted between the drums 6 made in the form of vanes 33 mounted vertically in a circumference and adapted for carrying the separated liquid onto the ring 16 of the lower drum 6. The vanes 33 are secured with their ends in the hubs 18 and 19 of each adjacent drum 6 and have a curvilinear shape in their cross-sections. The vanes 33 (FIG. 2) are provided with outer edges 34 bent inwards.

The ring 17 of the lower hub 19 spans from the end a cavity 35 of each drum 6 from below, and the ring 16 of the upper hub 18 spans from the end the cavity 35 of each drum 6 from above, and so the stem flow may enter the cavity 35 of the drums 6 only between the vanes 33 of the centrifugal separator 32 of each section. The cavity 35 of the lower drum 6 is isolated with a lock 36 from the circular space between the lower drum 6 and the body 1. The lock 36 is formed by a cylindrical shell 37 secured to the body 1 and provided in its upper portion with a ring 38 having a rim 39 along its inner diameter in combination with a lower ring 40 of the lower drum 6 having a rim 41 along its outer diameter.

A connection 42 serves for discharging still bottoms, and connections 43 for discharging secondary steam from the upper and the lower portion of the apparatus.

The evaporator operates in the following manner. The liquid being treated flows into the cylinder 25 through the connection 20. Upon the rotation of the rotor the liquid is thrown in jets from the radial tubes 26 of the cylinder 25 onto the inner surface of the cylindrical shell 23 from which it flows uniformly as a film onto the ring 16 of the upper drum 6. Under the effect of the centrifugal force the liquid is thrown from the ring 16 onto the inner surface of the hollow corrugated drum 6 and distributed over the projections of the corrugations 21 into separate vertical streams freely flowing under the effect of gravity to the openings 8 disposed at a different height in the drum 6. The streams of the liquid are thrown through the openings 8 onto the heat-exchanging surface 4 of the body 1 where they form a downward-directed film continuously turbulated by streams of the liquid and flow successively from the surface of the truncated cones 13 through the rounded bases 11 and 12 onto the surface of the lower cones 13. A portion of this liquid on the heat-exchanging surface 4 evaporates, and the liquid which has not evaporated flows to the circular collector 14 from where it flows through the channels 15 to the ring 16 of the lower drum 6 and the cycle is repeated. Still bottoms or the concentrated solution are removed through the connection 42 and the steam formed upon evaporation of the liquid is discharged from the apparatus through the connections 43 passing through the centrifugal separators 32 and separated by the blades 27. The liquid separated by the vanes of the centrifugal separator 32 is collected in vertical bends of the edges 34 of the vanes 33 and flows onto the ring 16 of the drum 6, and the liquid separated by the blades 27 is thrown onto the surface of the body 1 and flows downwards through a gap (not shown in the drawing) between the ring 29 and the body 1 onto the heat-exchanging surface 4 of the body 1.

Figure 3:
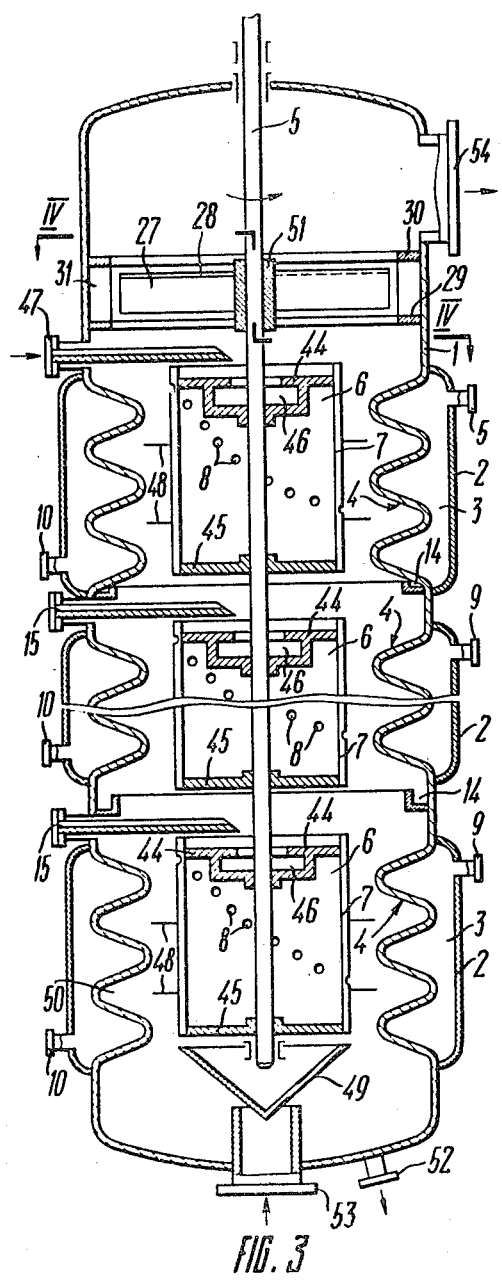
FIG. 3 is a general view of the vaporizer, according to the invention, in longitudinal section.

In the rotary film vaporizer shown in FIG. 3 the drums 6 are secured in their ends on the rings 44 of trays intended for distributing the liquid over the inner surface of the corrugations 21 of the drums 6 and on blind hubs 45 rigidly mounted on the shaft 5. The drums 6 are secured to the rings 44 of the trays and to the blind hubs 45 by means of bands and screws (not shown in the drawing). The tray for distributing the liquid being vaporized mounted on the upper end of each drum 6 is provided with a recess comprising a cylindrical vessel 46 mounted on the shaft 5; its edges are made in the form of a concentric ring 44 whose inner diameter is smaller than that of the cylindrical vessel 46 (FIG. 3). Due to this, the vertical concentric layer of the liquid formed under the ring 44 ensures a uniform flow of the liquid through the inner edge of the concentric ring 44 along its entire circumference and the subsequent distribution of the liquid over the surface of the ring 44 in the form of a film which is thrown onto the inner surface of the corrugations 21 of the drum 6. A connection 47 serves for feeding the liquid being vaporized onto the drums 6. On the drums 6 opposite the place of conjugation of the larger bases 11 of the cones 13 there are mounted horizontal rings 48 which ensure the flow of the gas phase (or a current of air or an inert gas) over the entire heat-exchanging surface 4 and the separation of the steam-gas mixture. A cone 49 (FIG. 3) is mounted under the lower drum 6 for uniformly feeding air to a circular gap 50 between the outer surface of the drums 6 and the heat-exchanging surface 4 of the body 1.

On the shaft 5 above the upper drum 6 there is mounted a bush 51 by means of which inclined blades 27 with bent edges 28 are made in the same manner, for separating drops of the liquid from the steam-gas flow. Rings 29 and 30 respectively are secured opposite the edges 28 above and under the blades 27. Baffles 31 are vertically mounted between the rings 29 and 30. Connections 52, 53 and 54 respectively serve for discharging the vaporized solution, feeding air and discharging air.

The rotary film vaporizer operates in the following manner. The solution to be vaporized is delivered to the cylindrical vessel 46 through the connection 47. Upon the rotation of the rotor the liquid under the effect of a centrifugal force rises on the walls of this vessel 46 forming a vertical concentric layer of the liquid under the ring 44. Flowing over the inner edge of the concentric layer 44 in its entire circumference the liquid spreads uniformly over the surface of the ring 44 in the form of a film, and then is thrown from its outer edge to the inner surface of the corrugations 21 of the drum 6 where it is separated in the projections of the corrugations 21 into individual vertical streams freely flowing under the effect of the gravity to the openings disposed at a different height in the drum 6. Through the openings 8 the streams of the liquid are thrown onto the heat-exchanging surface 4 of the body 1 where they form a downwardly-directed film continuously turbulated by jets of the liquid and flow successively from the surface of the truncated cones 13 over the rounded bases 11 and 12 onto the surface of the lower cones 13. A portion of this liquid on the heat-exchanging surface evaporates and the liquid which has not evaporated flows to the circular collector 14 from where through the channels 15 it flows onto the ring 44 of the lower drum and the cycle is repeated. The vaporized solution is discharged through a connection 52, and the air stream fed through a connection 52 flows over horizontally mounted rings 48 contacting the entire heat-exchanging surface of the body 1, moves upwards and passing by the blades 27 of the separator is discharged from the apparatus through a connection 54.

Figure 5:
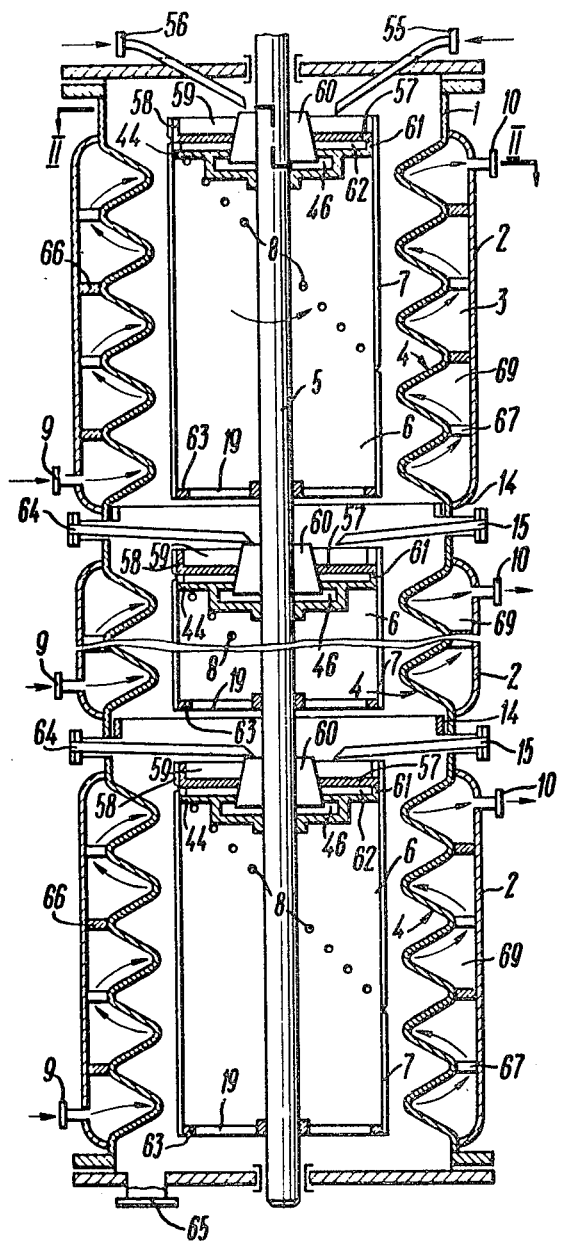
FIG. 5 is a general view of the reactor, according to the invention, in longitudinal section.
Figure 6:
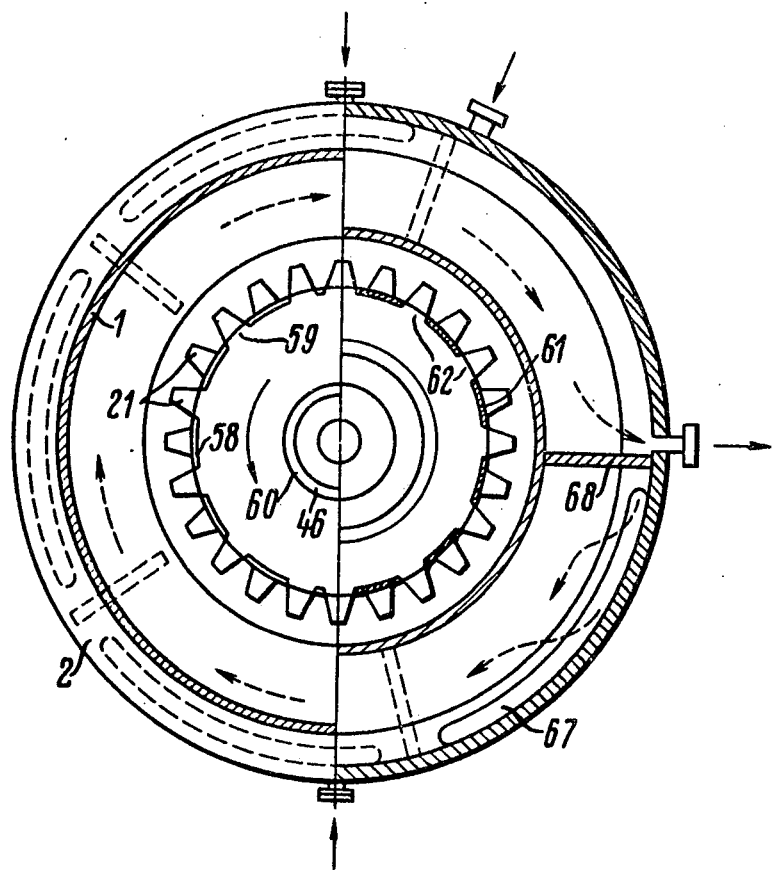
FIG. 6 is a section along VI—VI of FIG. 5.

In the rotary film reactor shown in FIG. 5 connections 55 and 56 serve for feeding different reactants onto the drums 6. A ring 57 is secured on the upper end of each drum 6 for distributing one of the reactants coming from a connection 55 onto the inner surface of the corrugations 21 of the drum 6. The ring 57 is provided with a rim 58 (FIG. 6) along its periphery having vertical slits 59. A truncated cone 60 serving as an inner rim is inserted along the inner diameter of the ring 57. The lower portion of the truncated cone 60 is disposed lower than the ring 57. Under the ring 57 there is mounted a tray for distributing the other reactant coming from the connection 56 onto the inner surface of the corrugations 21 of the drum 6.

The tray mounted on the upper end of each drum 6 under the ring 57 is provided with a recess comprising a cylindrical vessel 46 secured on a shaft 5; the edges of the vessel are made in the form of a concentric ring 44 whose inner diameter is smaller than that of the cylindrical vessel 46.

Due to this the vertical concentric layer of the liquid formed under the ring 44 ensures uniform flow of the liquid over the inner edge of the concentric ring 44 along its entire circumference and subsequent distribution over the surface of the ring 44 in the form of a film which is thrown onto the inner surface of the corrugations 21 of the drums 6.

The ring 44 is provided along its periphery with a rim 61 with vertical slits 62 disposed in a staggered pattern relative to the slits 59.

The drums 6 are secured in their ends on rings 44 of the trays and rings 63 (FIG. 5) of hubs 19 rigidly mounted on a shaft 5. The drums 6 are secured to the rings 44 of the trays and the rings 63 of the hubs 19 by means of bands and screws (not shown in the drawing).

In this case a circular collector 14 is provided between the sections of the apparatus for discharging the liquid from the heat-exchanging surface 4 of the section lying higher. Under each collector 14 there is disposed a channel 15 for overflowing and feeding one reactant to the drum 6 lying lower. A channel 64 serves for feeding another reactant.

A channel 65 serves for discharging the finished product from the reactor. According to the invention, in the space 3 of the jacket 2 there are mounted horizontal rings 66 enveloping the body 1 in the place of conjugation of the larger bases 11 of the cones 13. Each ring 66 is provided with an opening 67 (FIG. 6), which openings 67 in the adjacent rings 66 are offset relative to one another. Also in the space 3 in the direction of the movement of the cooling agent (heat carrier) a vertical partition 68 is mounted in front of each opening 67. The inner surface of the jacket 2, the ring 66 and the outer heat-exchanging surface 4 of the body 1 from a separate circular cavity 69 (FIG. 5) which serves for directing (along the dotted lines) the flow of the heat carrier in a circle and for progressive motion from the lower cavity to the upper one adjacent to it.

The rotary film reactor operates in the following manner. The reactants reacting between themselves are delivered separately through the connections 55 and 56 to the drums 6. One of the reactants is fed from the connection 55 to the rotating ring 57, distributed over its surface in the form of a film and through the slits 59 in the rim 58 is thrown onto the inner surface of the corrugations 21 of the drum 6 where it is separated into individual vertical flows over the projections of the corrugations. Another reactant is fed from the connection 56 to the cylindrical vessel 46. Under the effect of a centrifugal force the liquid rises on the walls of the vessel 46 forming a vertical concentric layer of the liquid under the ring 44. Flowing over the inner edge of the concentric ring 44 along its entire circumference it is uniformly distributed over its surface in the form of a film, and thrown from its outer edge through the slits 62 in the rim 61 onto the inner surface of the corrugations 21 of the drum 6 where it is distributed in the projections of the corrugations 21 adjacent to the corrugations 21 intended for the first reactant. The streams of the first and the second reactant flow under gravity to the openings 8 without mixing, and are thrown onto the heat-exchanging surface 4. Thus, the reactants are mixed directly on the heat-exchanging surface 4 which makes it possible to preclude even a minimal probability of overheating in the case of exothermic reactions. On the heat-exchanging surface 4 the streams of reactants form a downwardly-directed film continuously turbulated by jets of the liquid flowing over successively from the surface of the truncated cones 13 along the rounded bases 11 and 12 onto the surface of the cones lying lower. The liquid which has passed the first section in the path of movement is collected in the circular collector 14 from which it is delivered through the channels 15 to the ring 57 of the drum 6 lying lower, and as in the first section it is again distributed over the heat-exchanging surface 4 of the body 1. The additional delivery of one of the reactants through the channel 64 is provided to the second section as to any of the subsequent ones. The reaction product is discharged from the apparatus through the connection 65.

We claim:

1. A rotary film heat exchange apparatus comprising:

a rotatably mounted substantially vertically extending shaft;

at least one hollow drum coaxially fixed to and rotatable with said shaft, said hollow drum being defined by a substantially cylindrical corrugated wall having fluid discharge apertures formed therein;

a hollow vertically extending body coaxially surrounding said shaft and associated hollow drum, said hollow body having a heat exchange surface defined by a plurality of coaxially aligned vertically adjacent truncated ones, each of said truncated cones having opposed first reduced diameter and second enlarged diameter base regions, alternate pairs of said truncated cones being conjugated at respective first and second base regions;

a jacket surrounding said hollow body and defining therewith a space in which a heat carrier is adapted to circulate along a path; and horizontal rings circumferentially enveloping said body in the area of conjugation of said second enlarged base regions of the cones, said rings having openings in each of them, and along the path of movement of the heat carrier a vertical partition is mounted in front of each said opening consecutively offset relative to another whereby the heat carrier flows upwards in the space of said jacket performing a circular progressive motion and fluid to be treated is introduced into the interior of said drum and, upon rotation of said shaft, is thrown therefrom through said apertures onto said heat exchange surface defined by said truncated cones.

2. A rotary film apparatus as recited in claim 1 wherein said first and second base regions of said truncated cones are rounded in axial section.

3. A rotary film apparatus as claimed in claim 1, wherein the base regions of the conjugated cones form a semi-circle in the axial section.

* * * * *